United States Patent
Nogueira Da Silva et al.

(10) Patent No.: US 10,711,843 B2
(45) Date of Patent: Jul. 14, 2020

(54) MODULAR BEARING ASSEMBLY

(71) Applicant: SCHAEFFLER TECHNOLOGIES AG & CO. KG, Herzogenaurach (DE)

(72) Inventors: Thomas Nogueira Da Silva, Piedade (BR); Fabio Luis Vieira, Sorocaba (BR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/212,744

(22) Filed: Dec. 7, 2018

(65) Prior Publication Data

US 2020/0182302 A1    Jun. 11, 2020

(51) Int. Cl.
*F16C 35/04* (2006.01)
*F16C 19/06* (2006.01)

(52) U.S. Cl.
CPC ............ *F16C 35/047* (2013.01); *F16C 19/06* (2013.01)

(58) Field of Classification Search
CPC ......... F16C 19/06; F16C 35/047; B60K 17/24
See application file for complete search history.

(56) References Cited

U.S. PATENT DOCUMENTS

| 4,392,694 A * | 7/1983 | Reynolds ............... F16C 27/066 384/536 |
| 4,571,098 A * | 2/1986 | Rudnik ............... F16C 33/6622 384/474 |
| 7,044,646 B1 * | 5/2006 | Aiken .................... B60K 17/24 384/536 |
| 9,862,269 B2 * | 1/2018 | Roberts .................. B60K 17/24 |

FOREIGN PATENT DOCUMENTS

FR    2750465 A1 *  1/1998  ............ F16C 35/047

\* cited by examiner

*Primary Examiner* — Phillip A Johnson
(74) *Attorney, Agent, or Firm* — Brooks Kushman P.C.

(57) ABSTRACT

A bearing assembly includes a bearing and a housing that has opposing faces and opposing sides extending between the faces. At least one first connection feature is formed on the housing. The housing further has a bearing cavity that receives the bearing therein such that an axis of rotation of the bearing is perpendicular to the faces. A bracket defines an opening and at least one second connection feature configured to engage with the first connection feature to secure the bracket to the housing. The bracket is slidably received on the housing with the housing disposed in the opening and with the first and second connection features engaged.

16 Claims, 5 Drawing Sheets

MODULAR BEARING ASSEMBLY

TECHNICAL FIELD

The present disclosure relates to modular bearing assemblies that include a common type of bearing housing that is connectable to different types of brackets to form multiple types of bearing assemblies that can be used in a wide range of different applications.

BACKGROUND

A roller bearing includes concentric inner and outer races rotatable relative to each other. A plurality of rolling elements, e.g., balls or needles, are radially disposed between the inner and outer races and facilitate relative rotation. A housing supports the bearing and is used to attach the bearing to a substrate. Typically, the outer race is fixed to the housing and the inner race is fixed to a rotatable component. The housing is typically a single piece component, e.g., cast iron, that includes integrally formed flanges used to mount the housing to a substrate. The housings are designed for particular applications and typically new housings must be designed and manufactured when the bearing is being used in a new application.

SUMMARY

According to one embodiment, a modular bearing system includes a bearing housing supporting a bearing for rotation therein. The housing includes a first connection feature. The modular system also includes a first bracket of a first type or a second bracket of a second type that is different than the first type. Each bracket defines an opening sized to receive the housing and a second connection feature configured to engage with the first connection feature. One of the first and second brackets receives the housing therethrough with the first and second connection features engaged to secure the one of the first and second brackets to the housing.

According to another embodiment, a bearing assembly includes a bearing and a housing that has opposing faces and opposing sides extending between the faces. Each of the sides have a first connection feature. The housing further has a bearing cavity that receives the bearing therein such that an axis of rotation of the bearing is perpendicular to the faces. A bracket defines an opening and second connection features configured to engage with the first connection features to secure the bracket to the housing. The bracket is slidably received on the housing with the housing disposed in the opening and with the first and second connection features engaged.

According to yet another embodiment, a method includes providing a plurality of identical bearing housings each having at least one first connection feature and providing a plurality of first brackets each having at least one second connection feature configured to engage with the first connection features. The method further includes providing a plurality of second brackets each having at least one second connection feature configured to engage with the first connection feature. The second brackets may have a profile that is different than a profile of the first brackets. The method also includes forming a first bearing assembly by attaching one of the first brackets to one of the bearing housings with the first and second connection features engaged, and forming a second bearing assembly by attaching one of the second brackets to another of the bearing housings with the first and second connection features engaged.

DETAILED DESCRIPTION

Figure 1:
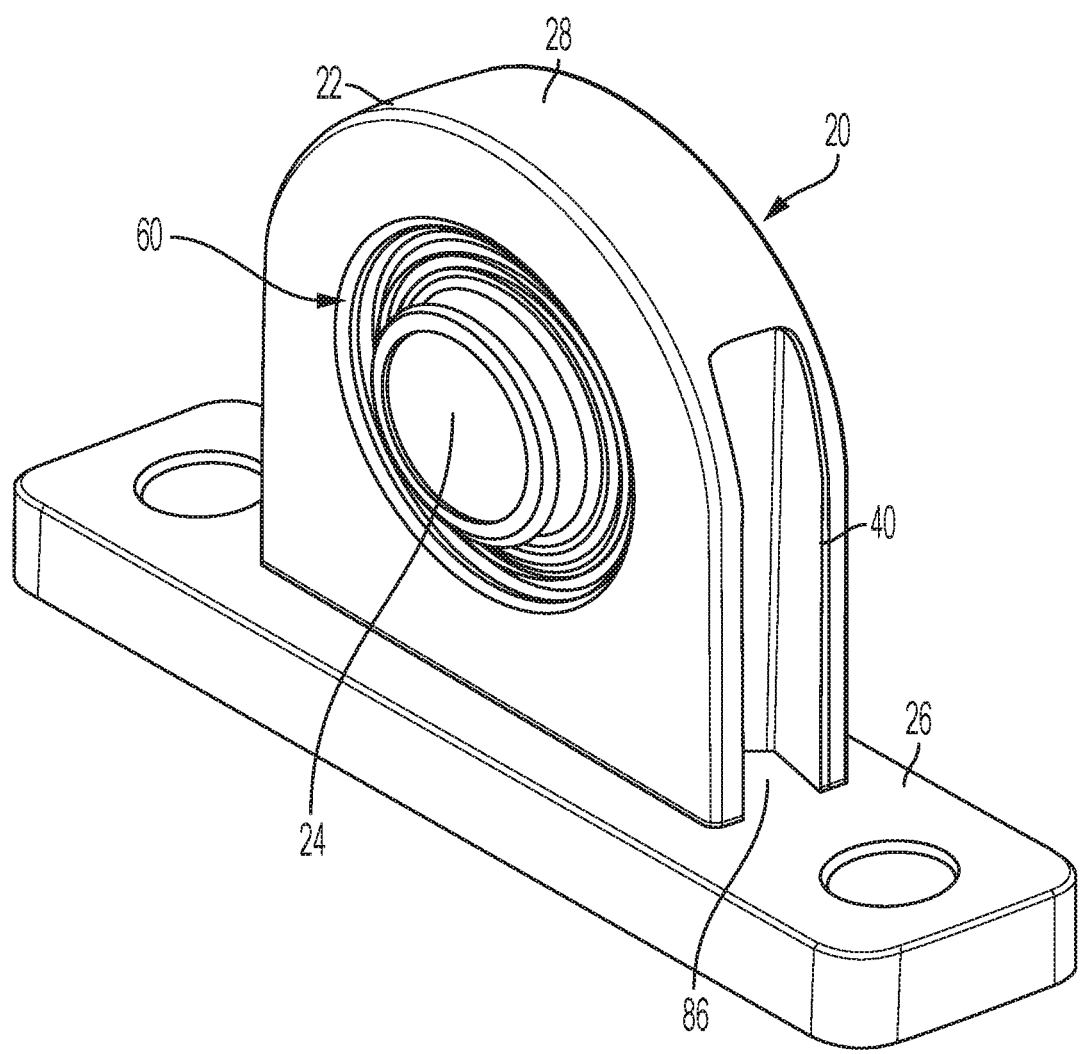
FIG. 1 is a perspective view of a two-piece modular bearing assembly.
Figure 2:
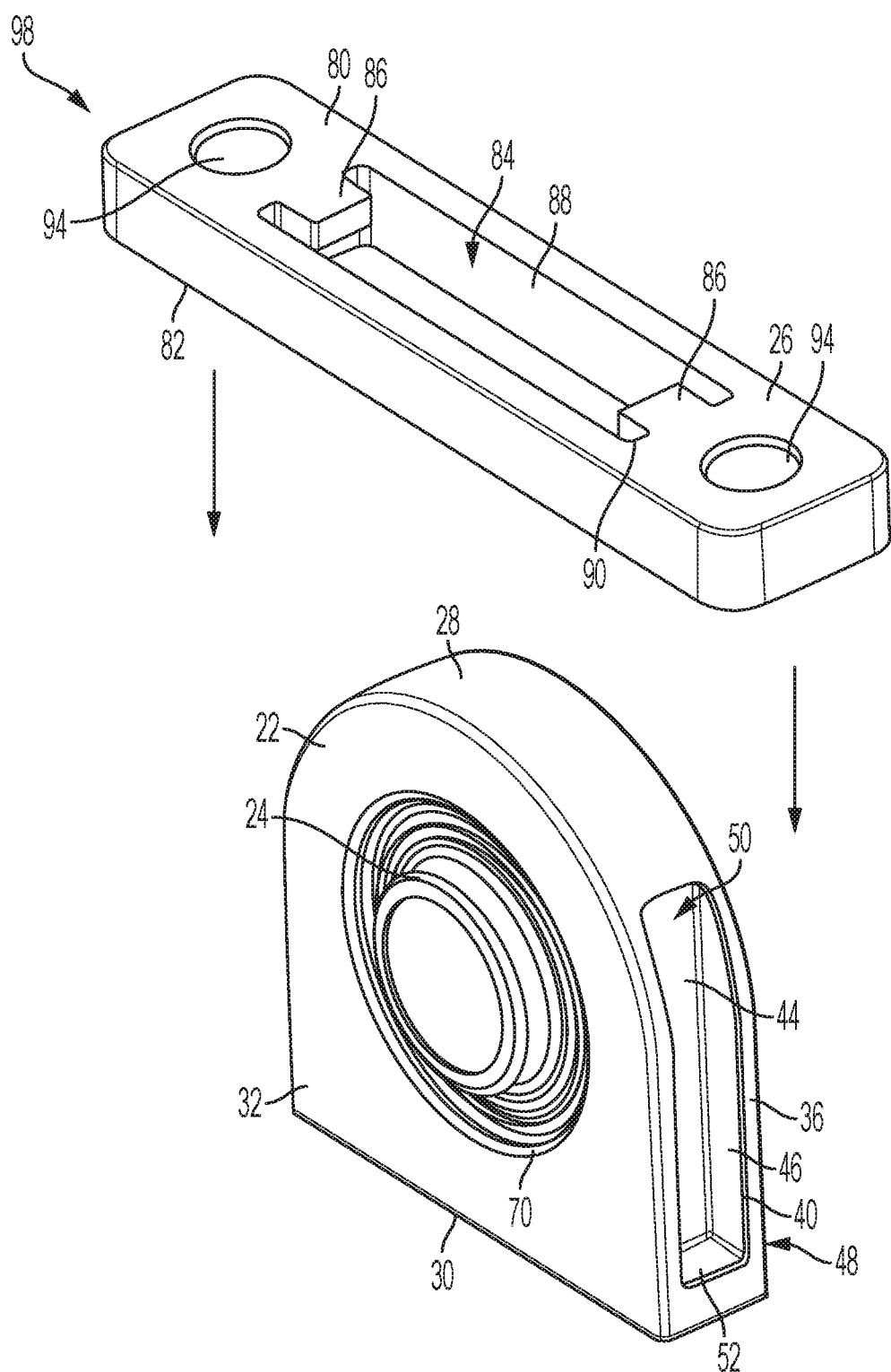
FIG. 2 is an exploded view of the bearing assembly.
Figure 3:
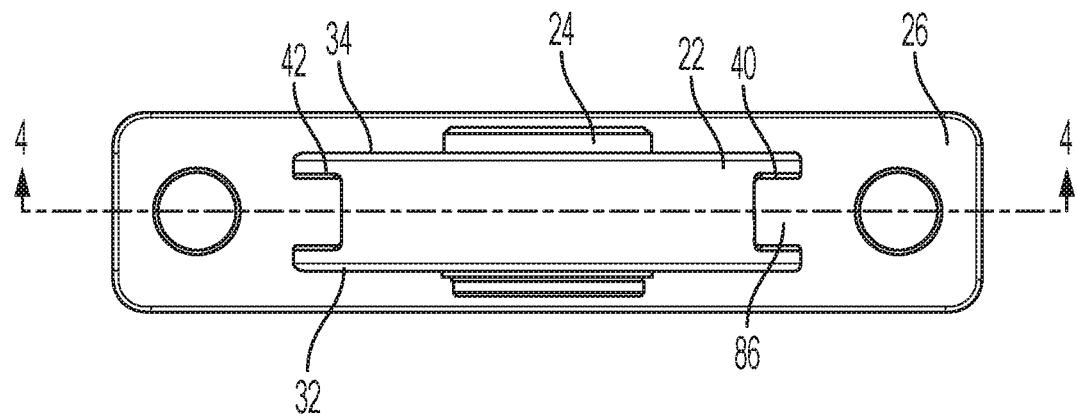
FIG. 3 is a top view of the bearing assembly.
Figure 4:
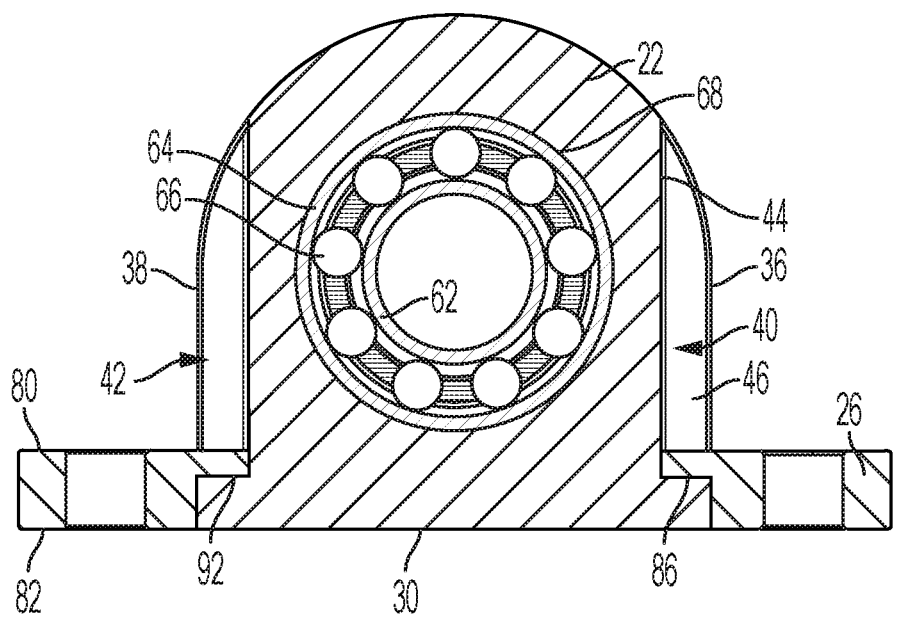
FIG. 4 is a section view of the bearing assembly along cutline 4-4.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±1% of the value or relative characteristic.

Referring to FIGS. 1 through 4, a modular bearing assembly 20 includes three main components: a bearing housing 22, a bearing 24, and a bracket 26 used to secure the bearing housing 22 to a substrate such as a vehicle body structure. The bearing assembly 20 is modular in that the bearing housing 22 is designed to work with a plurality of different brackets 26 each designed to attach the housing 22 in a particular application(s). The various unique brackets have different profiles specifically designed for use in particular applications. Profile may referrer to the size, shape, hole patterns, and the like of the bracket. The modular bearing assembly 20 may reduce costs and increase ease of manufacturing as compared to prior-art cast housings that limit the ability of a particular bearing assembly to be used in multiple applications. The flanges (bracket equivalent) of the prior-art cast bearing housings are integrally formed and cannot be swapped out.

The bearing housing 22 includes a top 28 and a bottom wall 30. (The terms top and bottom are used for convenience and it is to be understood that the bearing assembly 20 may be installed in many different orientations.) The bearing housing 22 may also include opposing faces 32, 34 and opposing sides 36, 38 that extend between the faces. A bearing chamber 60 of the housing 22 supports the bearing 24. The bearing chamber 60 may be a circular hole that extends between the faces 32, 34 with each face defining an opening 70 of the bearing chamber 60.

The bearing 24 may be a roller bearing that includes an inner race 62, an outer race 64 seated on a circumferential surface 68 of the bearing chamber 60, and a plurality of rolling elements 66. The rolling elements may be balls, needles, or the like. Of course, a roller bearing is only one example type of bearing and this application is not limited to any particular type bearing. The inner race 62 and the outer race 64 may be supported for relative rotation within the housing 22 and is positioned with a rotational axis of the bearing 24 being perpendicular to the faces 32, 34. The outer race 64 may be fixed to the bearing housing 22 and the inner race 62 may be rotatably supported therein. The inner race 62 may be attached to a shaft or other rotating member.

The bracket 26 includes a top surface 80 and a bottom surface 82. An opening 84, such as a slot, is defined in the bracket 26 and extends between the top surface 80 and the bottom surface 82 so that the opening 84 is completely through the bracket 26. In the slot embodiment, the opening 84 may include opposing long sides 88 and opposing short sides 90. A distance between the long sides 88 approximates the distance between the faces 32, 34 and the distance between the short sides 90 approximates the distance between the sides 36, 38 so that the bracket 26 is receivable on the bearing housing 22 without excessive play. The bracket 26 may be connected to the bearing housing 22 by inserting the top 28 of the bearing housing 22 through the opening 84 and continuing to pull the bracket 26 towards the bottom wall 30 of the housing until the bracket 26 bottoms out.

The bearing housing 22 and the bracket 26 may include connection features that cooperate to secure the bracket 26 to the housing 22. In the illustrated embodiment, channels and tabs are used as first and second connection features. The sides 36, 38 of the housing 22 may define open channels 40, 42, respectively, each having an open top 50, a vertical surface 44, side surfaces 46, and a closed bottom 48 that forms a seat 52. The bracket 26 may have a pair of tabs 86 each extending into the opening 84 from one of the short sides 90. The tabs 86 are designed to fit within the channels 42. The width of the channels 40, 42 between the side surfaces 46 approximates a width of the tabs 86 albeit slightly larger for ease of assembly.

The tabs 86 are received into the channels 40, 42 via the open tops 50 when the bracket 26 is inserted onto the bearing housing 22. The bracket 26 is fully installed on the bearing housing 22 when a bottom surface 92 of the tabs 86 is disposed against the seats 52. The tabs 86 retain the bearing housing 22 in place once the bracket 26 is secured to a substrate. To ensure sound attachment, a distance between the bottom surface 92 of the tab and the bottom 82 of the bracket is substantially equal to a distance between the bottom wall 30 of the housing and the seat 52 so that the bottom wall 30 is substantially flush with the bottom surface 82.

The bracket 26 has a first profile 98 in which the bracket 26 is rectangular with the fastener holes 94 being disposed adjacent to the sides 36, 38 and aligned with a centerline of the bracket. The fastener holes 94 are configured to receive fasteners (not shown) to attach the bearing assembly 20 to a substrate. The first profile 98 is merely an example and the bracket 26 may have any type of profile such as L-shaped, circular, or the like. Additionally, the profile 98 may include more or less or no fastener holes as well as other types of attachment features used for connecting the bearing assembly 20 to the substrate.

In an alternative embodiment, the tabs may be formed on the sides of the housing 22 and the channels may be formed in the bracket 26. Additionally, the connection features of the illustrated embodiment are not limiting and other types of connection features may be used to secure the bracket 26 to the bearing housing 22. For example, the housing and the bracket can be secured by fasteners, welding, or the like, or, the housing may define tabs that engage with tabs of the base. Furthermore, the connection features can be located on the front and back rather than the sides of the housing.

Figure 5:
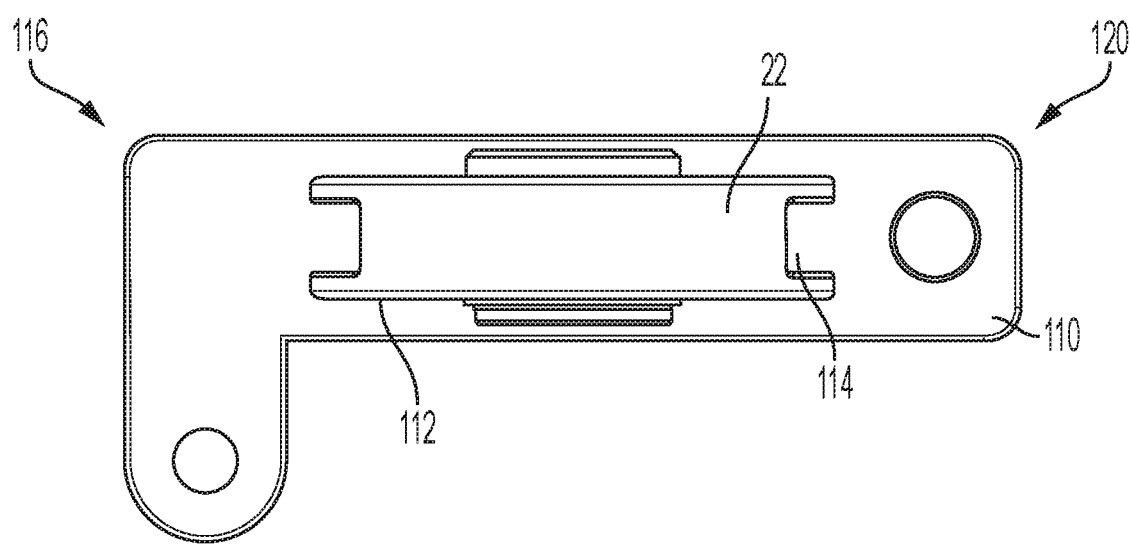
FIG. 5 is a top view of another bearing assembly.

Referring to FIG. 5, the housing 22 is designed to work with other types of brackets, such as bracket 110 having a profile that is different than the bracket 26 so that the bearing housing 22 may be attached to other substrates. The bracket 110 defines an opening 112 and connection features, e.g., tabs 114, that are the same as the bracket 26. The bracket 110 has a second profile 116 that is L-shaped and has fastener holes 118 that are located differently than the bracket 26.

Another bearing assembly 120 may be formed by inserting the bracket 110 onto the housing 22 enabling the bearing housing 22 to be mounted on a substrate corresponding with the bracket 110. Additional bearing assemblies may be formed by installing other brackets onto the housing 22. The brackets have the same openings and connection features to attach with the housing 22 but different profiles to attach with different substrates. This allows a manufacturer to make a plurality of common housings and combine them with a plurality of different types of brackets to produce multiple types of bearing assemblies suitable for different applications. This also allows a downstream entity to purchase a plurality of common housings and then combine them with different brackets so that the housings may be used in a plurality of different applications.

Figure 6:
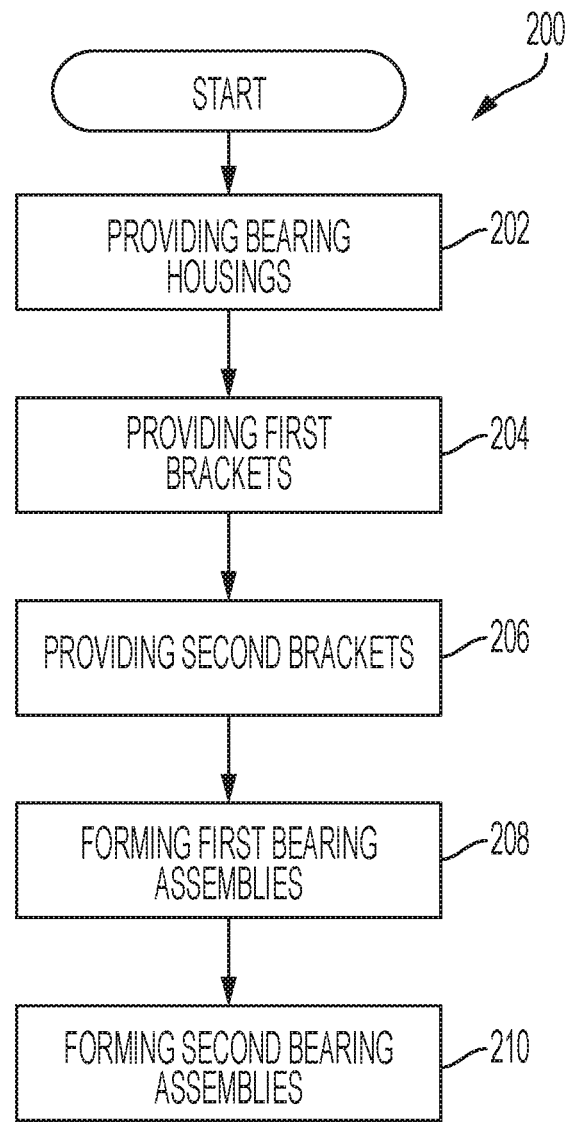
FIG. 6 is a flow chart illustrating a method of forming bearing assemblies.

Referring to FIG. 6, a method 200 of forming a plurality of different bearing assemblies from modular subcomponents will now be described. A plurality of identical bearing housings are provided at step 202. In this context "identical" refers to design and contemplates minor differences due to manufacturing limitations. The housings may be the same or similar to the bearing housings 22 that include a first connection feature such as the illustrated channels 40, 42. At step 204, a plurality of first brackets are provided. The first brackets may be the same or similar to bracket 26 and define an opening configured to receive the bearing housing therein. The first brackets may include a second connection feature, e.g., tabs 86, configured to engage with the first connection feature to secure the bracket to the housing. At step 206, a plurality of second brackets are provided. The second brackets may be the same or similar to bracket 110 and define an opening configured to receive the bearing housing therein. The first brackets may include a second connection feature configured to engage with the first connection feature to secure the bracket to the housing. The first and second brackets can be interchangeably connected to common types of housings to create different bearing assemblies for different applications. First bearing assemblies are formed by installing one of the first brackets onto one of the housings at operation 208. Second bearing assemblies are formed by installing one of the second brackets onto one of the housings at operation 210. Additional types bearing assemblies can be formed by providing other types of brackets and combining them with the housings.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

Parts List
20 Bearing assembly
22 bearing housing
24 roller bearing
26 bracket
28 top
30 bottom wall
32 face
34 face
36 side
38 side
40 channel
42 channel
44 vertical surface
46 side surfaces
48 closed bottom
50 open top
52 seat
60 bearing chamber
62 inner race
64 outer race
66 rolling elements
68 circumferential surface
70 openings
80 top surface
82 bottom surface
84 opening
86 tab
88 Long side
90 short side
92 bottom surface
94 fastener hole
98 first profile
110 bracket
112 opening
114 tab
116 second profile
118 fastener hole
120 bearing assembly

What is claimed is:

1. A modular bearing system comprising:
a bearing housing supporting a bearing for rotation therein, the housing including opposing sides each defining an open channel; and
a bracket defining an opening sized to receive the housing and a pair of tabs, wherein the bracket receives the housing therethrough with the tabs disposed in the open channels to secure the bracket to the housing.

2. The bearing system of claim 1, wherein each of the open channels has a bottom seat, and a bottom surface of the tab is disposed against the bottom seat.

3. The bearing system of claim 1, wherein the housing further includes opposing faces that extend between the opposing sides.

4. The bearing system of claim 3, wherein the bearing housing defines a hole that extends between the faces and the bearing is disposed in the hole.

5. The bearing system of claim 1, wherein the opening is a slot having opposing long sides and opposing short sides, wherein the tabs are disposed on the short sides.

6. The bearing system of claim 1, wherein the bracket defines at least one fastener hole.

7. The bearing system of claim 1, wherein the bearing includes inner and outer races and rolling elements radially disposed between the races.

8. A bearing assembly comprising:
a bearing;
a housing including:
opposing faces,
opposing sides extending between the faces, each of the sides defining open channels, and
a bearing cavity that receives the bearing therein such that an axis of rotation of the bearing is perpendicular to the faces; and
a bracket defining an opening and tabs configured to be received in the channels to secure the bracket to the housing, wherein the bracket is slidably received on the housing with the housing disposed in the opening and the tabs received in the channels.

9. The bearing assembly of claim 8, wherein each of the channels has an open end and a closed end forming a seat, wherein bottom surfaces of the tabs are disposed against the seats.

10. The bearing assembly of claim 8, wherein the tabs extend into the opening.

11. The bearing assembly of claim 8, wherein the housing further includes a bottom wall, and the open channels extend towards the bottom wall, and wherein each of the channels has an open end and a closed end that forms a seat.

12. The bearing assembly of claim 11, wherein a distance between a bottom surface of one of the tabs and a bottom of the bracket is substantially equal to a distance between the bottom wall of the housing and one of the seats.

13. The bearing assembly of claim 8, wherein the bracket defines at least one fastener hole.

14. The bearing assembly of claim 8, wherein the bearing includes inner and outer races and rolling elements radially disposed between the races.

15. A method comprising:
providing a plurality of identical bearing housings each having opposing sides that each define an open channel;
providing a plurality of first brackets each having tabs configured to be received within the open channels;

providing a plurality of second brackets each having tabs configured to be received within the open channels, wherein the second brackets have a profile that is different than a profile of the first brackets;

forming a first bearing assembly by attaching one of the first brackets to one of the bearing housings with the tabs of the first bracket being disposed within the open channels; and forming a second bearing assembly by attaching one of the second brackets to another of the bearing housings with the tabs of the second bracket being disposed within the open channels.

16. The method of claim 15, wherein the first and second brackets define openings, and wherein forming the first bearing assembly further includes inserting the one of the bearing housings into the opening of the one of the first brackets, and forming the second bearing assembly further includes inserting the another bearing housing into the opening of the one of the second brackets.

\* \* \* \* \*